H. M. SMITH.
MILK COOLING CAN.
APPLICATION FILED JUNE 9, 1916.
1,276,982.
Patented Aug. 27, 1918.
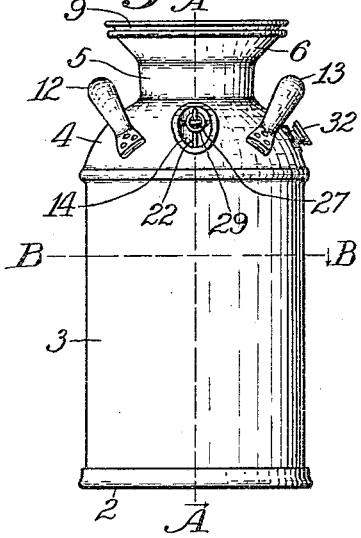
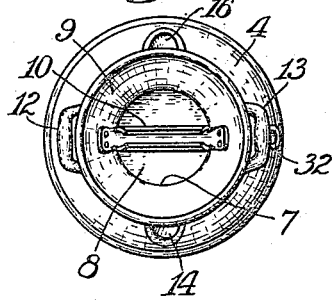
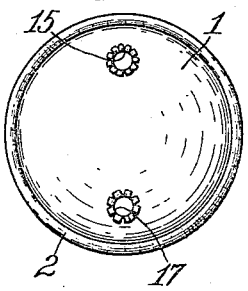
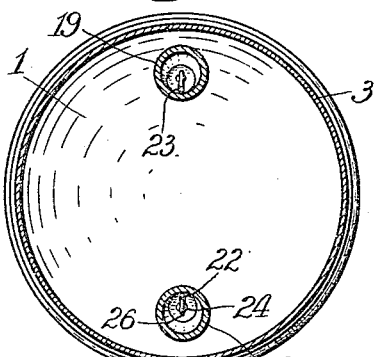
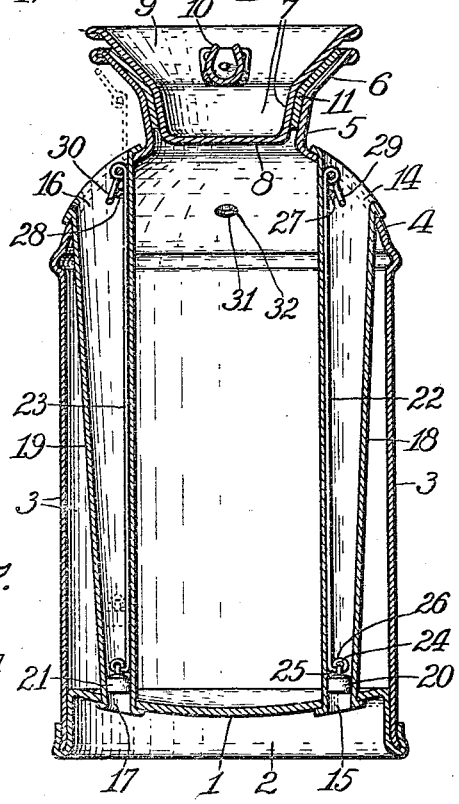
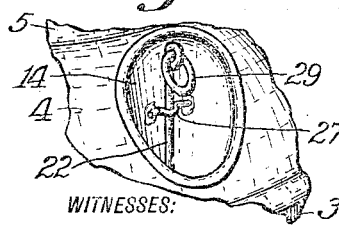
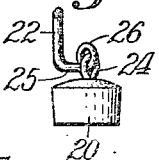
WITNESSES:
J. H. Gardner.
Myrtle McCoy.
INVENTOR:
Harvey M. Smith,
BY
E. T. Silvius,
ATTORNEY.

UNITED STATES PATENT OFFICE.

HARVEY M. SMITH, OF MOORESVILLE, INDIANA.

MILK-COOLING CAN.

1,276,982.  Specification of Letters Patent.  Patented Aug. 27, 1918.

Application filed June 9, 1916. Serial No. 102,649.

*To all whom it may concern:*

Be it known that I, HARVEY M. SMITH, a citizen of the United States, residing at Mooresville, in the county of Morgan and State of Indiana, have invented a new and useful Milk-Cooling Can, of which the following is a specification, reference being had to the accompanying drawings and to the letters and figures of reference marked thereon.

This invention relates to cans or containers for bulk milk and has reference more particularly to cans in which milk may be shipped and kept moderately cool and thus temporarily preserved during the period of shipment.

An object of the invention is to provide an improved can that shall be so constructed as to be adapted to conveniently receive fresh milk and permit cooling of the milk in the can either before or during shipment. Another object is to provide a milk-cooling can of such construction as to permit milk therein to be cheaply cooled and kept cool while being shipped to users of, or dealers in milk and without impairment of the quality of the milk. A further object is to provide a simple and inexpensive milk-cooling shipping can of such construction as to be adaptable for use in connection with mechanical milkers in order to receive the milk directly from the cow and prevent contamination of the milk until delivered to the consumer or dealer, and also preserve the quality of the milk.

With the above mentioned and other objects in view the invention consists in a can or receptacle for milk provided with novel means whereby the contents of the can may be cooled and kept cool sufficiently to preserve the milk until it can be conveniently disposed of. The invention consists also further in the parts and combination and arrangements of parts as hereinafter particularly described and further defined in the accompanying claims.

Referring to the drawings, Figure 1 is a side elevation of the improved can; Fig. 2 is a top plan of the can; Fig. 3 is a bottom plan of the can; Fig. 4 is a vertical section on the line A A on Fig. 1; Fig. 5 is a transverse section on the line B B on Fig. 1; Fig. 6 is a fragmentary perspective view of the upper portion of the can as preferably constructed, and Fig. 7 is a fragmentary perspective view of one of the movable parts and controlling device therefor comprised in the invention.

Similar reference characters on the various figures of the drawing indicate corresponding elements or features of construction herein referred to.

A practical embodiment of the invention comprises a receptacle which may be similar in general to the shipping cans commonly used and comprises a bottom 1 having a supporting flange or base 2, a cylindrical body wall 3 being connected to and extending upward from the bottom and having a top 4 connected thereto. The top has inclined side portions, preferably is crowning and has a tapering neck 5 connected thereto which has a flaring mouth 6. The can or container is provided with a suitable closure which may conveniently be in the form of a pressed metal hollow tapering plug 7 having a disklike bottom 8 connected to its lower portion and a flaring upper portion 9 to the inside of which a handle 10 is secured. A suitable packing ring 11 is provided and placed between the closure and the neck of the vessel. The top 4 of the vessel is provided with handles 12 and 13. The various details of construction above mentioned may be variously modified as may be desirable.

An important feature of the invention comprises a tube, or preferably a plurality of tubes arranged vertically in the container and having open ends so that air may pass through the tubes. For the purpose of illustrating the preferred construction two tubes are shown, one tube having one end 14 inserted in a suitable opening in the top 4 and tightly secured thereto, and the opposite end 15 inserted in a suitable opening in the bottom 1 and tightly secured thereto; a similar tube having one end 16 secured in a top 4 and its opposite end 17 secured in the bottom 1. The tubes preferably are tapering and so arranged that their larger ends are uppermost; and preferably the tubes are so arranged that their longitudinal or major axes are inclined so as to diverge upwardly each from the other to such degree that the inner portions of the walls of the tubes are vertical. So arranged the main or body portions 18 and 19 of the tubes extend through the space within the container at sufficient distance from the wall 3 to permit circulation of milk between the tubes and the adjacent portions of the wall, the circulating space being relatively greater near the bottom of the vessel. The tubes when unobstructed permit atmospheric air to pass through them and assist in reducing the temperature of the milk when the latter is warmer than the air. Also, water may rise in the tubes in case the vessel with milk in it is placed and partially sunken into any convenient body of water, resulting in assisting to cool the milk.

In order to facilitate the cooling of the milk and keep it cool during shipment by means of ice, stoppers or plugs 20 and 21 are provided that are tapering and of proper size to fit into the lower portion of the tube, to constitute a bottom to hold water in the tube. The stoppers are provided respectively with controlling rods 22 and 23 that extend therefrom upwardly in the tubes approximately to the upper ends thereof. The rods may be variously connected to the stoppers, but preferably each stopper is provided with an eye 24, each rod having a lateral finger 25 on its lower end that extends through the eye and is bent over to constitute a retaining ring 26. The inside of the upper portions 14 and 16 of the tubes are provided respectively with guides 27 and 28 through which the controlling rods respectively extend, and the upper ends of the rods are provided with links 29 and 30 respectively whereby to lift or control the rods and thereby control the stoppers.

In order that the can or vessel may be filled directly from the cows when performing the milking operations, the top 4 of the vessel is provided with a suitable aperture 31 and a closure 32 therefor, and obviously a vacuum-milker may be adapted to be connected with the aperture to accomplish the required well known result when the closure of the vessel is tightly packed in the neck of the vessel.

In practical use the stoppers may be seated in the lower ends of the cooling-tubes and the tubes may be filled with either cold water or crushed ice, the ice being preferred when the milk is to be promptly shipped. The interior of the vessel thus being cooled the result will be that the milk will lose its warmth while being received into the vessel, whether poured into the vessel or drawn into it by means of the milker. In some cases the vessel may be filled with milk before placing the water or the ice in the cooling-tubes, as may be most convenient or desirable. In some cases the stoppers or bottoms 20 and 21 may be lifted from their normal positions which will permit the water that may be in the tubes to run out, after which the tubes may be refilled with ice, which may in some cases be desirable immediately before shipping the milk, so that the cans may arrive at their destination while ice still remains in the cooling tubes.

Having thus described the invention, what is claimed as new is—

1. A shipping-can comprising a cylindrical container having an upright tube extending therethrough that is tapering uniformly from end to end thereof, the top of the container being adapted to be sealed, the larger end of the tube being uppermost and rigidly secured in the top of the container, and the major axis of the tube being inclined with respect to the major axis of the container.

2. A milk-cooling shipping-can having an upright unitary tube extending therethrough that is tapering uniformly from end to end thereof, the larger end of the tube being rigidly secured in the top of the shipping-can and having a guide secured therein, the smaller end of the tube being rigidly secured in the bottom of the shipping-can, a stopper in the tube below said guide, and a rod extending movably through said guide and connected to the stopper.

3. In a shipping-can comprising a bottom, a side wall, a top having inclined side portions with a central neck, and a closure for the neck, the combination of a plurality of tubes arranged adjacent to the inside of the side wall, each tube being unitary and tapering uniformly from end to end and having its larger end inserted in and secured to an inclined portion of said top between said wall and said neck, the extremity of said end of the tube being oblique-angled relatively to the major axis of the tube and conforming to the inclination of said top, the smaller end of each tube being inserted in and secured to said bottom.

In testimony whereof, I affix my signature in preesnce of two witnesses.

HARVEY M. SMITH.

Witnesses:
  MERL C. PARK,
  R. S. BALLARD.

Copies of this patent may be obtained for five cents each, by addressing the "Commissioner of Patents, Washington, D. C."